(12) United States Patent
Kimura

(10) Patent No.: US 9,429,423 B2
(45) Date of Patent: Aug. 30, 2016

(54) RANGING APPARATUS

(75) Inventor: Takayuki Kimura, Kawasaki (JP)

(73) Assignee: RICOH COMPANY, LTD., Tokyo (JP)

( * ) Notice: Subject to any disclaimer, the term of this patent is extended or adjusted under 35 U.S.C. 154(b) by 557 days.

(21) Appl. No.: 13/995,298

(22) PCT Filed: Dec. 26, 2011

(86) PCT No.: PCT/JP2011/080566
§ 371 (c)(1),
(2), (4) Date: Jun. 18, 2013

(87) PCT Pub. No.: WO2012/091151
PCT Pub. Date: Jul. 5, 2012

(65) Prior Publication Data
US 2013/0271746 A1    Oct. 17, 2013

(30) Foreign Application Priority Data

Dec. 28, 2010  (JP) ................................. 2010-291734
Mar. 30, 2011  (JP) ................................. 2011-074855

(51) Int. Cl.
*G01C 3/08* (2006.01)
*G02B 7/00* (2006.01)
(Continued)

(52) U.S. Cl.
CPC ................. *G01C 3/08* (2013.01); *G02B 7/003* (2013.01); *G02B 7/30* (2013.01); *G03B 13/20* (2013.01); *H04N 5/2253* (2013.01)

(58) Field of Classification Search
CPC ........... G01C 3/08; G01C 3/06; G02B 7/003
See application file for complete search history.

(56) References Cited

U.S. PATENT DOCUMENTS 5,233,382 A    8/1993  Taniguchi et al.
6,046,795 A    4/2000  Sugiyama et al.
(Continued)

FOREIGN PATENT DOCUMENTS

CN    101715062 A    5/2010
JP    08-237554      9/1996
(Continued)

OTHER PUBLICATIONS

Combined Office Action and Search Report issued on Dec. 22, 2014 in Chinese Patent Application No. 201180062648.6 with English translation.

(Continued)

*Primary Examiner* — Luke Ratcliffe
*Assistant Examiner* — Samantha K Abraham
(74) *Attorney, Agent, or Firm* — Oblon, McClelland, Maier & Neustadt, L.L.P

(57) ABSTRACT

A ranging apparatus includes a body, a substrate on which a sensor unit is mounted and fitted to a surface of the body, a sensor holder attached to the surface of the body and configured to hold the substrate, a lens unit attached to another surface of the body, and a positioning mechanism to position and connect the body, the surface and the sensor holder. The positioning mechanism includes first and second engaging parts which are provided between the body and the substrate and configured to engage the body and the substrate, and third and fourth engaging parts which are provided between the substrate and the sensor holder and configured to engage the substrate and the sensor holder. The first and second engaging parts are different in shape, and the third and fourth engaging parts are different in shape.

8 Claims, 8 Drawing Sheets

(51) Int. Cl.
*G02B 7/30* (2006.01)
*G03B 13/20* (2006.01)
*H04N 5/225* (2006.01)

(56) References Cited

U.S. PATENT DOCUMENTS

| | | | |
|---|---|---|---|
| 6,097,026 A | 8/2000 | Tsai | |
| 6,337,736 B1 | 1/2002 | Sugiyama et al. | |
| 6,498,624 B1 | 12/2002 | Ogura et al. | |
| 6,693,674 B1 | 2/2004 | Wataya et al. | |
| 2002/0119658 A1 | 8/2002 | Honda et al. | |
| 2003/0010390 A1* | 1/2003 | Beck | B60T 8/368 137/884 |
| 2003/0071342 A1 | 4/2003 | Honda et al. | |
| 2008/0001727 A1 | 1/2008 | Ohsumi et al. | |
| 2010/0085474 A1 | 4/2010 | Morita | |
| 2010/0188565 A1 | 7/2010 | Tanaami | |

FOREIGN PATENT DOCUMENTS

| | | |
|---|---|---|
| JP | 09-318867 | 12/1997 |
| JP | 10-326886 | 12/1998 |
| JP | 11-281351 | 10/1999 |
| JP | 2000-059581 | 2/2000 |
| JP | 2000-241161 | 9/2000 |
| JP | 2001-099643 | 4/2001 |
| JP | 2001-275022 A | 10/2001 |
| JP | 2003-189195 | 7/2003 |
| JP | 2004-080575 | 3/2004 |
| JP | 2006-308496 | 11/2006 |
| JP | 2008-129470 | 6/2008 |
| JP | 2008-261974 | 10/2008 |
| JP | 2009-53571 A | 3/2009 |
| JP | 2010-002233 | 1/2010 |
| JP | 2010-016673 | 1/2010 |
| JP | 2012-237844 | 12/2012 |
| WO | WO2006/052024 A1 | 5/2006 |

OTHER PUBLICATIONS

International Search Report Issued on Feb. 21, 2012 in PCT/JP2011/080566 Filed on Dec. 26, 2011.

Extended European Search Report issued Jan. 7, 2016 in Patent Application No. 11852292.9.

* cited by examiner

US 9,429,423 B2

RANGING APPARATUS

TECHNICAL FIELD

The present invention relates to a ranging apparatus which measures a distance from the ranging apparatus to an object, more specifically to a ranging apparatus capable of assembling easily and accurately.

BACKGROUND ART

A conventional ranging apparatus to measure a distance to an object, for example, a subject includes a body, a lens attached to one end surface of the body and imaging an image of the subject, and a sensor which is attached to another end surface of the body and detects the image of the subject imaged by the lens. In assembling the conventional ranging apparatus, the sensor is first fixed through an adhesive or the like to the body, and the lens is then fixed to the body by positioning the lens and the sensor while disposing the lens to face the sensor. If necessary, after the sensor, the body and the lens are positioned, they are fixed by welding.

Because fine assembly accuracy is not required for a one-dimensional sensor such as a line sensor, it is not difficult to adjust a position between the sensor and the lens. However, in a ranging apparatus using a plurality of imaging elements (CCD sensors or MOS sensors) capable of ranging more accurately as a sensor, a more high accuracy to position between the imaging elements and a lens is requested. Consequently, a difficulty is involved in the ranging apparatus using the imaging elements when performing the positioning between the imaging elements and the lens.

In the ranging apparatus to measure a distance by use of the plurality of imaging elements, a distance is computed based on image data output from each imaging element. Therefore, if a positioning between the lens and each imaging element and between the imaging elements is not performed accurately, the accuracy of image data to measure a distance is inferior. Consequently, there is a problem that it is not possible to measure a distance accurately.

Therefore, in the ranging apparatus using the plurality of imaging elements, a high accuracy for position alignment between each imaging element as a sensor and the lens is requested, and it is necessary to enhance accuracy to attach the imaging elements and lens to the body. As a result, there is a difficulty to the positioning in the ranging apparatus using the plurality of imaging elements, compared with the conventional ranging apparatus.

To overcome the problem as mentioned above, some ranging apparatuses as shown in, for example, Japanese Patent Application Publication Nos. H10-326886, 2004-080575, and 2001-099643 have been proposed.

In a conventional ranging apparatus using a two-dimensional sensor, it is attempted to enhance accurately of a positioning of a sensor and a lens by a jig used exclusively for a assemble process. In addition, a shape of each of a substrate on which a sensor is mounted and a lens holder to which a lens is fixed has been improved to correspond to a positioning by a jig, as shown in Japanese Patent Application Publication Nos. H10-326886, and 2004-080575.

A jig is used in each of a fixed imaging apparatus as shown in Japanese Patent Application Publication No. H10-326886, and an imaging apparatus as shown in Japanese Patent Application Publication No. 2004-080575. Consequently, there are complications of preparing an exclusive jig and an assemble process. If the apparatus is assembled without using the jig in priority to working efficiency, it is not possible to improve accuracy of a positioning of a sensor and a lens.

Therefore, it is requested to provide a ranging apparatus capable of assembling easily it, improving assembly efficiency, and positioning a sensor and a lens accurately without requiring a complicate assembly process using an exclusive jig or the like.

SUMMARY OF INVENTION

An object of the present invention is to provide a ranging apparatus capable of positioning a plurality of parts in the ranging apparatus accurately and assembling them easily.

To accomplish the above object, a ranging apparatus according to an embodiment of the present invention includes a body, a substrate on which a sensor unit is mounted and fitted to a surface of the body, a sensor holder attached to the surface of the body and configured to hold the substrate on which the sensor unit is mounted, a lens unit attached to another surface of the body, and a positioning mechanism to position and connect the body, the substrate and the sensor holder.

The positioning mechanism includes a first engaging part and a second engaging part which are provided between the body and the substrate and configured to engage the body and the substrate, and a third engaging part and a fourth engaging part which are provided between the substrate and the sensor holder and configured to engage the substrate and the sensor holder.

The first engaging part and the second engaging part are different in shape, and the third engaging part and the fourth engaging part are different in shape.

DESCRIPTION OF EMBODIMENTS

Preferred embodiments of the present invention will be explained hereinafter in detail with reference to the accompanying drawings. FIGS. 1 to 7B illustrate a first embodiment of a ranging apparatus according to the present invention.

Figure 1:
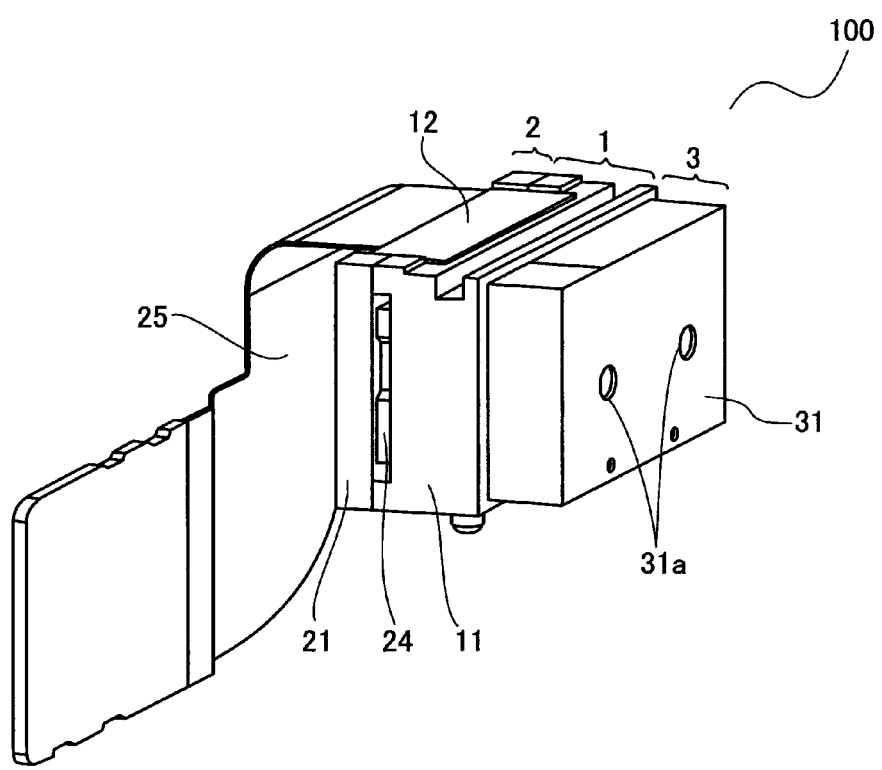
FIG. 1 is a perspective view showing a ranging apparatus according to a first embodiment of the present invention.

In FIG. 1, the ranging apparatus 100 includes a fixing part 1, a lens holding part 3 mounted on one surface, for example, a front surface of the fixing part 1, and a sensor holding part 2 mounted on a back surface of the fixing part 1. The ranging apparatus 100 is configured to measure a distance from the ranging apparatus to an object based on an image data formed by imaging an image pick up by the lens holding part 3 on the sensor holding part 2.

The fixing part 1 includes a body 11 formed integrally by, for example, a resin material. The body 11 includes a first recess 11a provided in a front surface of the body 11 and a recess, that is, a second recess 11b provided in a back surface of the body 11 (see FIG. 2). The first recess 11a is configured to contain a part of the lens holding part 3 and the second recess 11b is configured to contain a part of the sensor holding part 2, as mentioned below.

Figure 2:
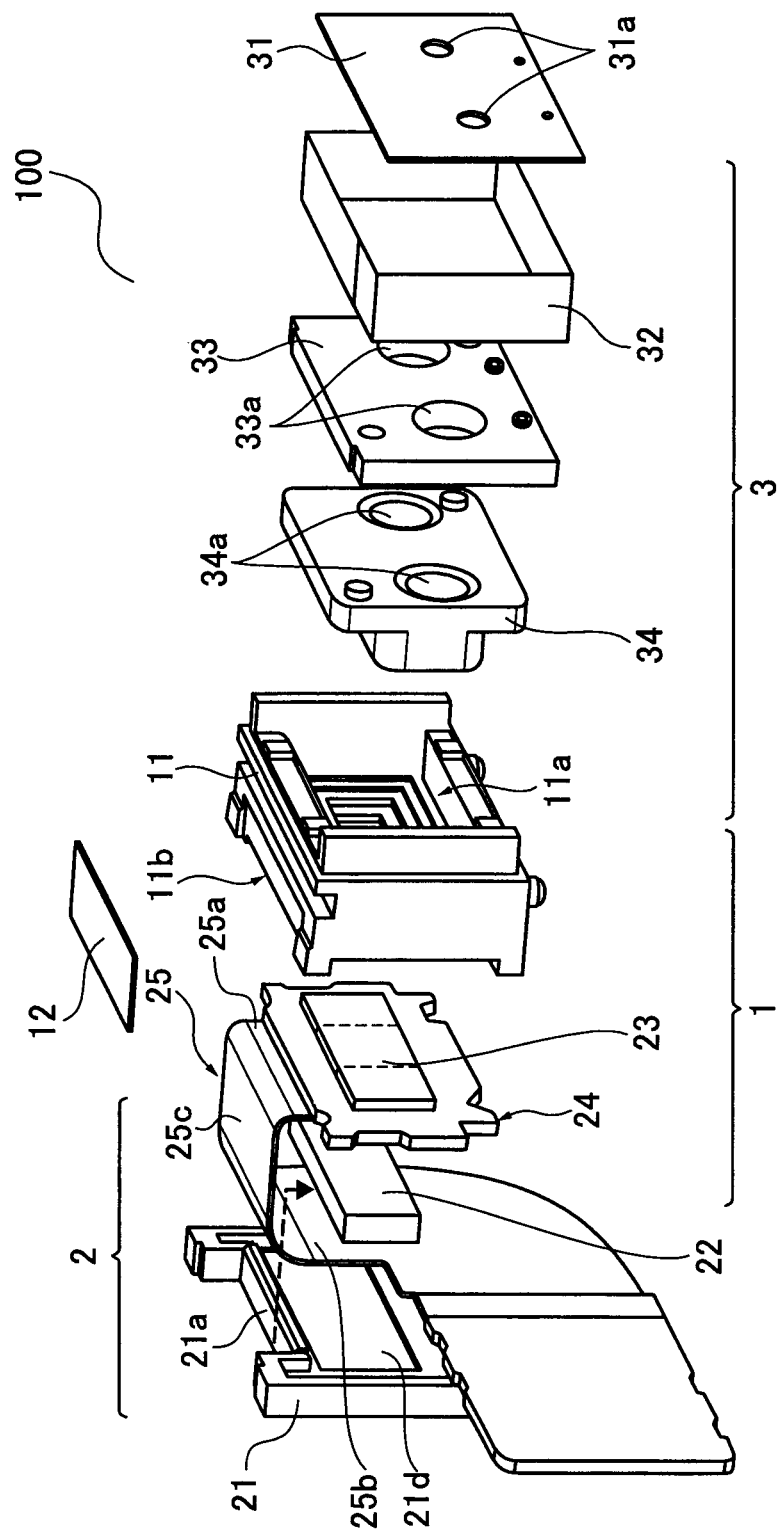
FIG. 2 is an exploded perspective view showing the ranging apparatus shown in FIG. 1.
Figure 3:
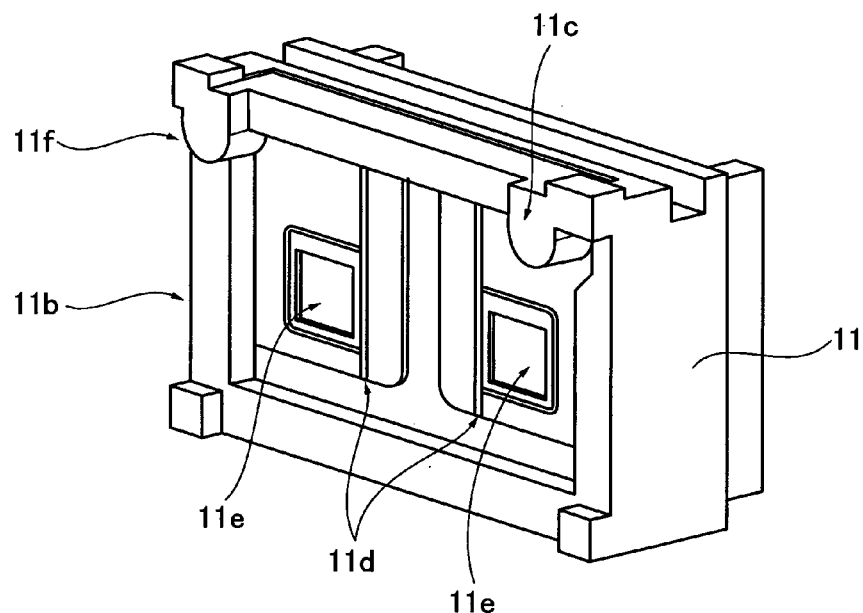
FIG. 3 is a perspective view showing a body used in the ranging apparatus.

The body 11 comprises, for example, a box-like member having a predetermined thickness in a front and back direction, as shown in FIGS. 2 and 3. The second recess 11b is configured to contain the substrate 24 therein. The second recess 11b is formed by recessing a circumference of the back surface of the body 11 in approximately a rectangular shape (see FIG. 3).

The sensor holding part 2 includes a substrate 24 and a sensor unit 23 mounted on a front surface of the substrate 24. The substrate 24 is provided with an electric wiring pattern (not shown) to which the sensor unit 23 is electrically connected. The sensor unit 23 includes, for example, two sensors, each being a two-dimensional sensor, for example, which is an imaging element such as a CCD or CMOS, as mentioned below. The ranging apparatus 100 is configured to compute a distance from the ranging apparatus to the object by achieving a parallax computation by use of two image data acquired from the two sensors and using the computed result. The parallax computation achieved herein uses the principle of triangulation method. It is, therefore, possible to acquire a high accurate measured result compared with a line sensor.

To enhance accuracy for the parallax computation, a high accuracy acquisition of the image data necessary to the parallax computation is required. Therefore, it is requested to enhance accuracy required for assembling the two sensors and accuracy for a positioning between each sensor and a lens facing the sensor. The ranging apparatus according to the first embodiment and a second embodiment as mentioned below has a structure in which a distance can be measured with a high accuracy and an assembly of the ranging apparatus can be achieved easily.

As mentioned above, the fixing part 1 disposed on a central portion of the ranging apparatus 100 is configured to fix the sensor holding part 2 and the lens holding party 3 integrally.

The ranging apparatus 100 is explained in further detail with reference to FIG. 2. In FIG. 2, the sensor holding part 2 further includes a wiring member 25 having at one end portion an inverted U-character shaped portion having a pair of spaced vertical portions 25a, 25b and a horizontal portion 25c connecting the vertical portions 25a, 25b, an elastic member 22 disposed to be in contact with the vertical portion 25a between the vertical portions 25a, 25b, and a sensor holder 21 disposed to compress the substrate 24 against the body 11, the elastic member 22 and the wiring member 25 between the vertical portions 25, 25b against the body 11 and attached to the body 11. The wiring member 25 is preferably made of a thin plate having a better electrical conductivity.

The vertical portion 25a of the wiring member 25 is disposed on a back surface of the substrate 24 and connected to the electrical wiring pattern provided on the substrate 24.

In fixing the sensor holding part 2 to the fixing part 1, the substrate 24 is first fitted on the back surface of the body 11 in such a manner that the sensor unit 23 is contained in the second recess 11b of the body 11 of the fixing part 1. Here, the second recess 11b has a predetermined depth necessary to contain the sensor unit 23 therein.

The substrate 24 on which the sensor unit 23 is mounted and to which the wiring member 25 is connected is fitted on the back surface of the body 11. The elastic member 22 is then disposed on a back surface of the vertical portion 25a and the sensor holder 21 is disposed on a back surface of the elastic member 22, and the sensor holder 21 presses the substrate 24 against the body 11 to hold the substrate 24 and the wiring member 25. The elastic member 22 acts to hold the substrate 24 on the body 11. The elastic member 22 is attached to a front surface of the sensor holder 21 and made of a material having elasticity, for example, a hard sponge. More specifically, the elastic member 22 is fitted in a recess 21d (see FIGS. 2 and 6) provided in the front surface of the sensor holder 21.

Figure 6:
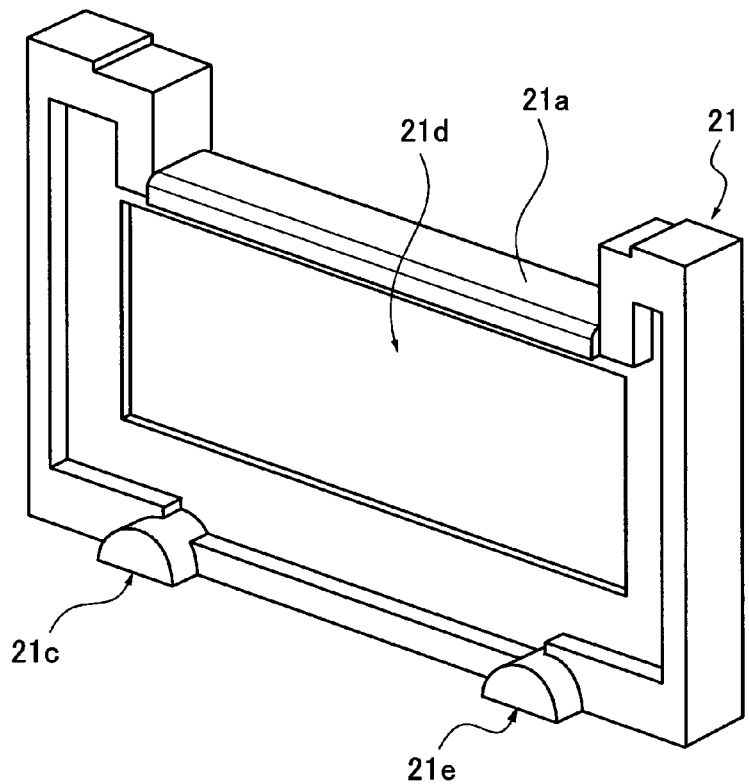
FIG. 6 is a perspective view showing a sensor holder used in the ranging apparatus.

As shown in FIGS. 2 and 6, the sensor holder 21 includes a concave portion 21a provided in an upper side of the sensor holder and has a predetermined depth. The concave portion 21a acts to contain the horizontal portion 25c of the wiring member 25 therein when the ranging apparatus 100 is assembled.

When the substrate 24 is attached to the body 11 by the sensor holder 21, a pressure force occurs because the elastic member 21 is disposed between the substrate 24 and the sensor holder 21, thereby the substrate 24 can be attached securely to the body 11.

The body 11, the substrate 24 and the sensor holder 21 are positioned by a positioning mechanism as mentioned below. If necessary, after the body 11, the substrate 24 and the sensor holder 21 are positioned, the sensor holder 21 is fixed to the body 11 by use of any method which will be described hereinafter.

After the sensor holder 21 is fixed to the body 11, a clearance of a connection portion between the body 11 and the sensor holder 21 is covered by a protective sheet 12, thereby dust or the like is prevented from entering the body 11 through the clearance. The protective sheet 12 is a sealed member, for example, a sheet-like member, which is attached to an upper surface of each of the body 11 and the wiring member 25 by use of a suitable adhesive.

The substrate 24 comprises, for example, a plate having approximately a rectangular shape. The sensor unit 23 includes a plurality of sensors, that is, a plurality of imaging elements mounted on the substrate 24. The imaging elements comprise, for example, a laterally arranged triadic elements cutout from the same semiconductor wafer. Because the imaging elements cut out from the same semiconductor are used as the sensor, it is possible to eliminate a variation in a characteristic of each sensor. When using two outwardly disposed elements of the triadic elements, it is possible to establish accurately a separation (reference length) between the sensors necessary to acquire a parallax.

The wiring member 25 connected to the substrate 24 is a flexible sheet-like cable configured to take out from the sensor unit an image signal corresponding to an object image imaged on the sensor unit 23. The wiring member 25 is connected to an image processing device (not shown) which is configured to compute a distance of an object.

The lens fixing part 3 disposed on the front surface of the body 11 includes a lens unit 34 fitted in the first recess 11a of the body 11, a lens holder 33 to hold the lens unit 34, a light-shielding sheet 32 and an aperture stop 31 (see FIGS. 1 and 2). The first recess 11a of the body 11 has a predetermined size to fit the lens unit 34 therein.

The lens unit 34 fitted in the first recess 11a of the body includes two lenses 34a, as shown in FIG. 2. The two lenses 34a have a predetermined focus distance and are configured to image an image of an object to be measured on the light-receiving surface of the sensor unit 23. The lens unit 34 is held in the first recess 11a of the body 11 by the lens holder 33.

The lens holder 33 acts to fix the lens unit 34 to the body 11, as mentioned above and includes openings 33a each of which is provided at a position corresponding to each of the two lenses 34a of the lens unit 34 and passes an image of an object to reach the lenses 34a. The aperture stop 31 is attached to a front surface of the lens holder 33.

The aperture stop 31 acts to adjust an amount of incident light of an object image imaged on the sensor unit 23 and includes two holes 31a each provided at a position corresponding to each of the two lenses 34a of the lens unit 34 and each of the openings 33a of the lens holder 33.

Connection portions of the lens unit 34, the lens holder 33 and the aperture unit 31 are covered by a light-shielding member 32. The light-shielding member 32 is a box-like member formed by a sheet and covers the connection portions of the lens unit 34, the lend holder 33 and the aperture stop 31 circumferentially. The lens holding part 3 is integrally attached to the body 11 by the light-shielding member 32. A clearance of the connection portions are sealed by the light-shielding member 32 to be prevent dust or the like from entering in the body 11 and the lens holding part 3.

Turning to the body 11, it includes two spaced holes 11e disposed close to a central portion of the second recess 11b of the body 11 (see FIG. 3). The holes 11e are arranged to correspond to a position of each light-receiving surface of the sensor unit 23 and configured to image an image of an object passing the lenses 34a on the light-receiving surface of the sensor unit 23. As shown in FIG. 3, the body 11 includes an abutment mechanism, for example, ribs 11d, each of which is disposed along one side of each of the holes 11e close to a central portion of the second recess 11b and vertically extends to reach an upper end of the second recess 11b. The ribs 11d are arranged so that right and left edges of a central sensor of the triadic sensors of the sensor unit 23 are abutted with the ribs 11d. The ribs 11d have a predetermined height projecting from a bottom surface of the second recess 11b. The height of the ribs 11d is set so that the light-receiving surface of the sensor unit 23 is fixed at a position to fit the sensor unit 23 to a focal distance of the lenses 34a of the lens unit 34.

In mounting the sensor holding part 2 on the fixing part 1, the height of the ribs 11d is previously adjusted, and the sensor unit 23 may be abutted with the adjusted ribs 11d, thereby the sensor unit 23 and the lens unit 34 can easily be assembled.

The ranging apparatus 100 includes a positioning mechanism 500 to position and connect the body 11, the substrate 24 and the sensor holder 21.

As shown in FIGS. 3 to 6, the positioning mechanism 500 includes a first engaging part 501 and a second engaging part 502 which are provided between the body 11 and the substrate 24 and configured to engage the body 11 and the substrate 24, and a third engaging part 503 and a fourth engaging part 504 which are provided between the substrate 24 and the sensor holder 21 and configured to engage the substrate 24 and the sensor holder 21.

The first engaging part 501 includes, for example, a first groove 24a provided in the substrate 24 and a first protrusion 11c provided on the body 11 and engaged in the first groove 24a. The second engaging part 502 includes, for example, a second groove 24b provided in the substrate 24 and a second protrusion 11f provided on the body 11 and engaged in the first groove 24b. The third engaging part 503 includes, for example, a third groove 24c provided in the substrate 24 and a third protrusion 21c provided on the sensor holder 21 and engaged in the third groove 24c. The fourth engaging part 504 includes, for example, a fourth groove 24d provided in the substrate 24 and a fourth protrusion 21e provided on the sensor holder 21 and engaged in the fourth groove 24d.

Figure 5:
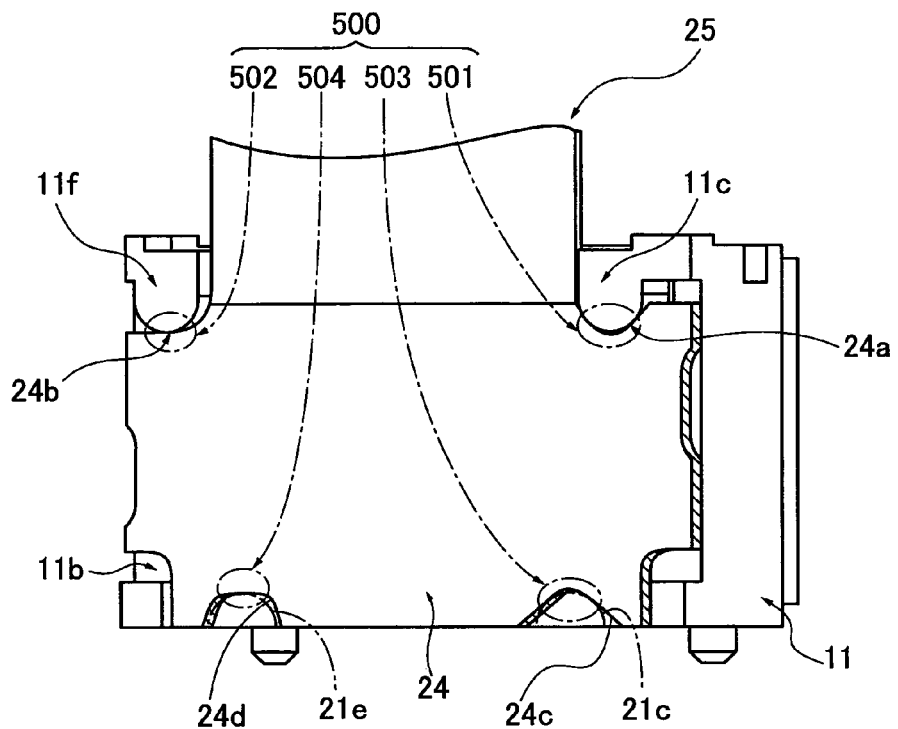
FIG. 5 is a perspective view showing an assembled state of the substrate and the body in the ranging apparatus.

More specifically, the first protrusion 11c and the second protrusion 11f are provided on right and left end portions of an upper side of the back surface of the body 11 above the second recess 11b, as shown in FIGS. 3 and 5. As shown in FIG. 3, the first protrusion 11c and the second protrusion 11f have half cylindrical portions each having a predetermined height from the back surface of the body 11 and formed integrally with the body 11.

In the first embodiment, each of the first protrusion 11c and the second protrusion 11f is formed in, for example, a half cylindrical shape in section to project downwardly toward the second recess 11b. Each of the first protrusion 11c and the second protrusion 11f may be formed in various shapes. The shape of each of the first protrusion 11c and the second protrusion 11f is not limited to the shape mentioned above. In the first embodiment, the first protrusion 11c and the second protrusion 11f have the same shape.

Figure 4:
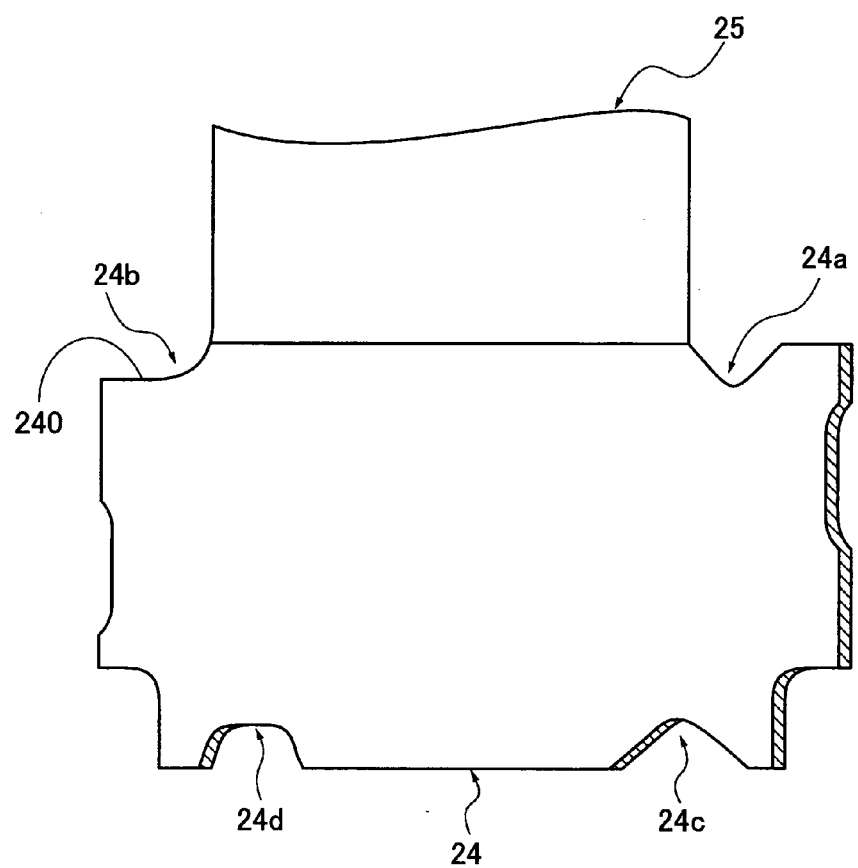
FIG. 4 is a perspective view showing a substrate used in the ranging apparatus.

As shown in FIG. 4, the first groove 24a and the second groove 24b are provided in a first side which is an upper side of the substrate 24. The third groove 24c and the fourth groove 24d are provided in a second side which is a lower side of the substrate 24.

Here, the first engaging part 501 and the second engaging part 502 are different in shape.

As mentioned above, in the first embodiment, the first protrusion 11c and the second protrusion 11f are the same in shape. However, the first groove 24a has approximately a V-character shape formed in one end, that is, the right end of the first side of the substrate 24, as viewed in FIG. 4, and the second groove 24b has a groove in which an edge portion of the opposite end to the one end, that is, the left end of the first side of the substrate 24 is cutout in a circular arc. Consequently, the first engaging part 501 and the second engaging part 502 are different in shape.

As shown in FIG. 4, the third groove 24c has approximately a V-character shape provided in one end, that is, a right end of the second side of the substrate 24 and is disposed to face the first groove 24a in an up and down direction. The fourth groove 24d has approximately a trapezoidal shape provided in another end, that is, a left end of the second side of the substrate 24 and is disposed to face the second groove 24b in an up and down direction.

Meanwhile, each of the first to fourth grooves 24a, 24b, 24c and 24d is formed in the substrate 24 to have a predetermined depth in a height direction (up and down direction in FIG. 4) of the substrate 24. In the ranging apparatus according to the present invention, a position of each of the first to fourth grooves 24a, 24b, 24c and 24d is not limited to the position as shown in the illustrated embodiment. For example, these grooves may be provided in right and left ends (in FIG. 4) of the substrate 24 with predetermined depths.

As shown in FIG. 6, the third protrusion 21c and the fourth protrusion 21e are provided on the front surface of the sensor holder 21. More specifically, the third protrusion 21c is provided on, for example, one end of a lower edge of the sensor holder 21 and the fourth protrusion 21c is provided on another end of the lower edge of the sensor holder 21. The third protrusion 21c has a semi-circular shape in section having a half cylindrical portion and the fourth protrusion 21d has the same semi-circular shape having a half cylindrical portion as the third protrusion 21c (see FIG. 6).

Each of the third protrusion 21c and the fourth protrusion 21e extends from the front surface of the sensor holder 21 to have a predetermined height. The third protrusion 21c and the fourth protrusion 21e are disposed at positions corresponding to the third groove 24c and the fourth groove 24d, respectively, so that the third protrusion 21c and the fourth protrusion 21e are fitted in the third groove 24c and the fourth groove 24d, respectively.

The third protrusion 21c is engaged in the third groove 24c of the substrate 24, and the fourth protrusion 21e is engaged in the fourth groove 24d of the substrate 24. Here, although the third and fourth protrusions 21c and 21d have the same shape, because the third and fourth grooves 24c and 24d of the substrate 24 have a different shape.

Consequently, the third engaging part 503 and the fourth engaging part 504 are different in shape.

As mentioned above, because the first engaging part 501 and the second engaging part 502 are different in shape, and the third engaging part 503 and the fourth engaging part 504 are different in shape, there is no error in a mounting position in mounting the substrate 24 on the body 11 and the sensor holder 21 on the substrate 24.

Next, an assembly method of the body 11, the substrate 24, and the sensor holder 21 is explained.

FIG. 5 illustrates a state where the substrate 24 is fitted in the second recess 11b of the body 11.

First, when sliding the substrate 24 on which the wiring member 25 is attached upwardly while fitting the substrate 24 in the second recess 11b, the first protrusion 11c is first fitted in the first groove 24a, and the second protrusion 11f is then fitted in the second groove 24b. When the first protrusion 11c is fitted in the first groove 24a, the first protrusion 11c engages with inclines of the V-character shape of the first groove 24a. Consequently, the first protrusion 11c is in contact with the first groove 24a at two points, thereby the substrate can be positioned stably. When the second protrusion 11f is fitted in the second groove 24b, the second protrusion 11f is placed on an upper surface 240 of the second groove 24b. Consequently, the second protrusion 11f is in contact with the second groove 24b at one point, thereby the substrate 24 is mounted on the body 11 at three points so that the positioning of the body 11 and the substrate 24 can be adjusted accurately and finely until the sensor holder 21 is attached to the substrate 24.

In the aforementioned structure, when fitting the first protrusion 11c in the V-character shaped groove 24a, forming a fulcrum between the substrate 24 and the body 11, and rotating and sliding the substrate 24, the substrate 24 can easily be fitted in the second recess 11b. Because the second protrusion 11f is fitted in the second groove 24b of the substrate 24 which is fitted in the second recess 11b of the body 11, the substrate 24 can easily be assembled on the body 11.

When applying the sensor holder 21 to an assembly of the body 11 and the substrate 24 (see FIG. 5) from the back surface of the substrate 24, the third protrusion 21c of the sensor holder 21 is fitted in the third groove 21c of the substrate 24, and the fourth protrusion 21e of the sensor holder 21 is fitted in the fourth groove 24d of the substrate 24.

The third protrusion 21c is fitted in the third V-character shaped groove 24c such that the half cylindrical portion of the third protrusion 21c abuts with inclines of the third groves 24c. Consequently, the third protrusion 21c is fitted in the third groove 24c in such a way as to be in contact with the third groove at two points. In addition, the fourth protrusion 21e is fitted in the fourth trapezoidal groove 24d in such a way as to be in contact with an upper surface of the fourth groove 24d at one point.

In a state where the substrate 24 is fixed by being sandwiched between the body 11 and the sensor holder 21, the first side (upper side) of the substrate 24 is secured by the first and second protrusions 11c and 11f of the body 11, and the second side (lower side) of the substrate 24 is secured by the third and fourth protrusions 21c and 21e of the sensor holder 21.

Because the first groove 24a of the substrate 24 is the V-character groove being in contact with the first protrusion 11c of the body 11 at the two points, and the third groove 24c of the substrate 24 is the V-character groove being in contact with the third protrusion 21c of the sensor holder 21 at the two points, and the fourth groove 24b of the substrate 24 is in contact with the second protrusion 11f of the body at one point and the fourth groove 24d is in contact with the fourth protrusion 21e of the sensor holder 21, it is possible to accomplish the fitting of the second groove 24b and the second protrusion 11f by use of the V-character grooves 24a as the fulcrum and the fitting of the fourth groove 24d and the fourth protrusion 21 by use of the V-character grooves 24c as the fulcrum. Consequently, it is possible to assemble the body 11, the substrate 24 and the sensor holder 21 easily.

Next, a method of fixing integrally the sensor holding part 2 and the lens holding part 3 to the fixing part 1 is explained with reference to FIGS. 7A and 7B. Meanwhile, the light-shielding member 32 and the aperture stop 31 are not illustrated in FIG. 7B.

Figure 7A:
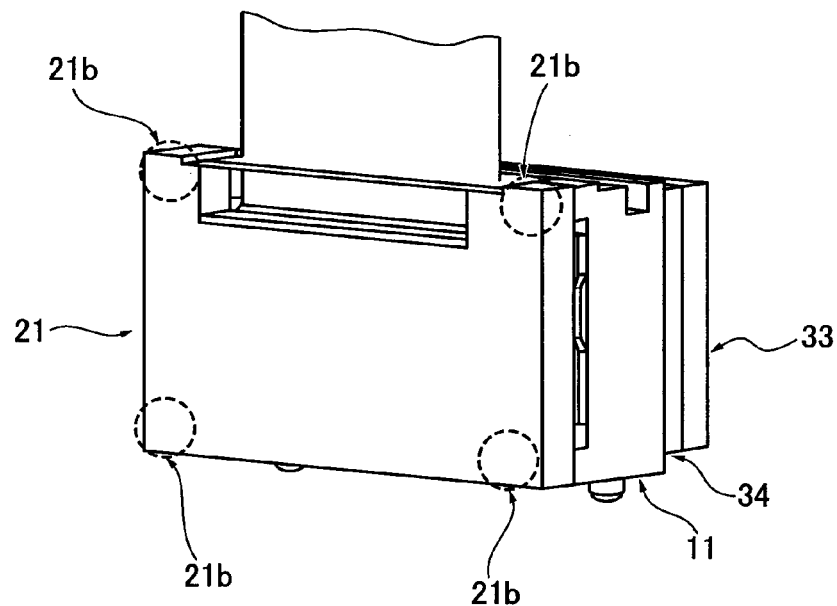
FIG. 7A is a perspective view showing an assembled state of the ranging apparatus, as viewed from front.
Figure 7B:
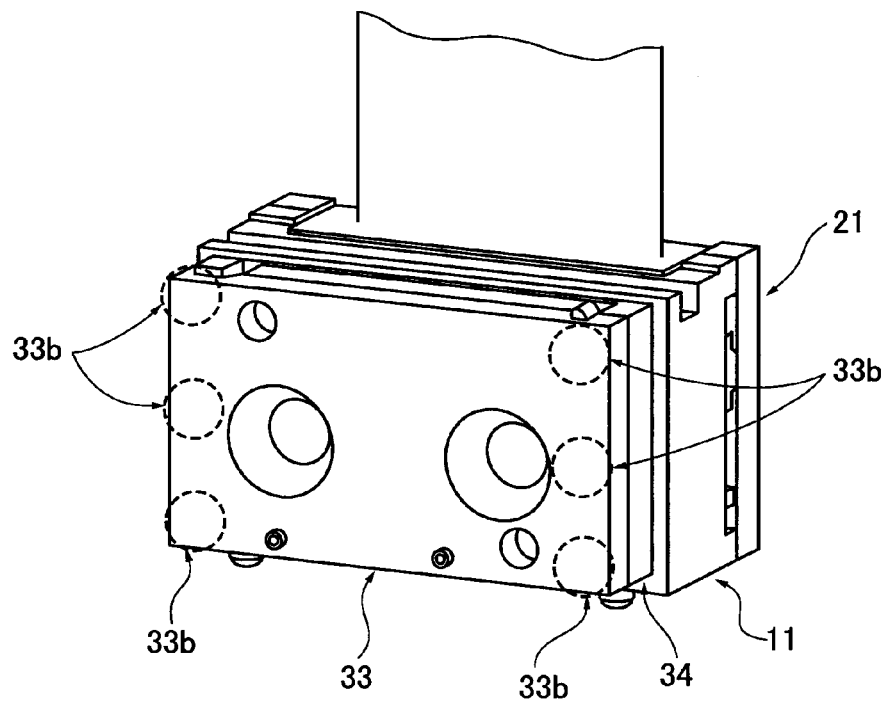
FIG. 7B is a perspective view showing the assembled state of the ranging apparatus, as viewed from back.

In an example as shown in FIG. 7A, the body 11 and the sensor holder 21 are made of the same resin material through which a laser light can be transmitted. The body 11 and the sensor holder 21 are fixed by irradiating the laser light at portions 21b, for example, four corners of the sensor holder 21, as shown in FIG. 7A to melt a boundary portion between the body 11 and the sensor holder 21. Similarly, the body 11 and the lens holder 33 are made of the same resin material through which a laser light can be transmitted. The body 11 and the lens holder 33 are fixed by irradiating the laser light at portions 33b, for example, four corners and right and left ends of the lens holder 33, as shown in FIG. 7B to melt a boundary portion between the body 11 and the lens holder 33.

In the first embodiment as mentioned above, it is possible to assemble easily and accurately the body to which the lens unit is fixed and the substrate by a particulate shape of the body, the substrate, and the sensor holder, and after the assembly, the body 11, the sensor holder 21 and the lens holder 33 can be fixed integrally by welding the boundary portions thereof by the laser light.

Next, a ranging apparatus according to a second embodiment of the present invention is explained with reference to FIG. 8.

In the second embodiment, identical reference numbers are attached to the similar parts to that in the first embodiment, and a duplicated description is omitted.

Figure 8:
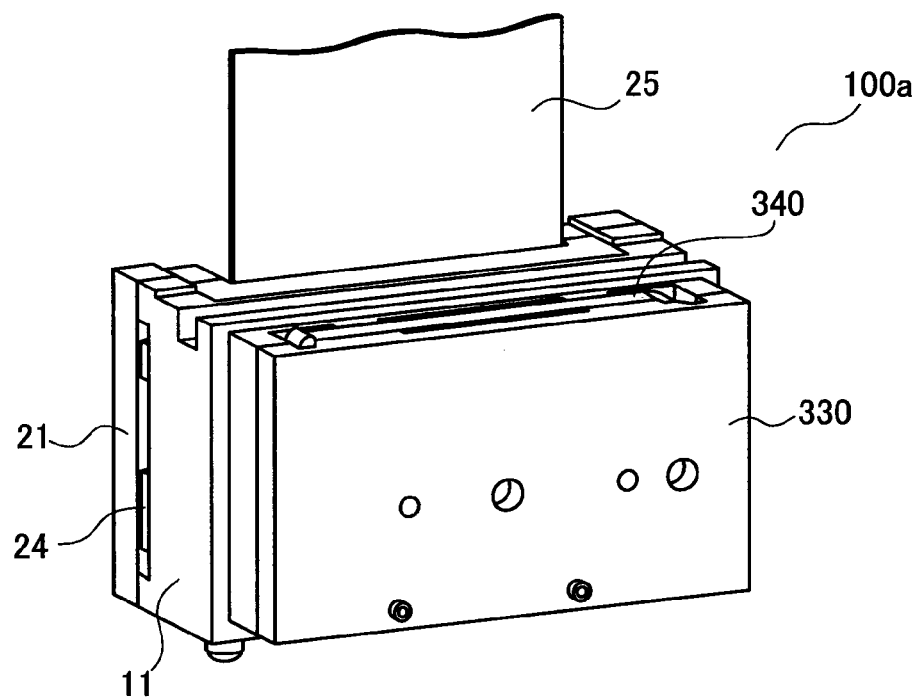
FIG. 8 is a perspective view showing a ranging apparatus according to a second embodiment of the present invention.

In FIG. 8, a ranging apparatus 100a in the second embodiment includes a body 11 which has a box-like shape having a predetermined thickness forward and backward, a lens unit 340 attached to a front surface of the body 11, and a substrate 24 attached to a back surface of the body 11. In addition, a lens holder 330 is attached to a front surface of the lens unit 340 and configured to hold the lens unit 340. A sensor unit 23 is mounted on a front surface of the substrate 24. The substrate 24 is configured to be held by a sensor holder 21. A wiring member 25 is connected to the substrate 24 and extends upward from the substrate 24 between the body 11 and the sensor holder 21.

In addition, in FIG. 8, a member (not shown) corresponding to the aperture stop 31 in the ranging apparatus 100 in the first embodiment is attached to a front surface of the lens holder 330.

Figure 9:
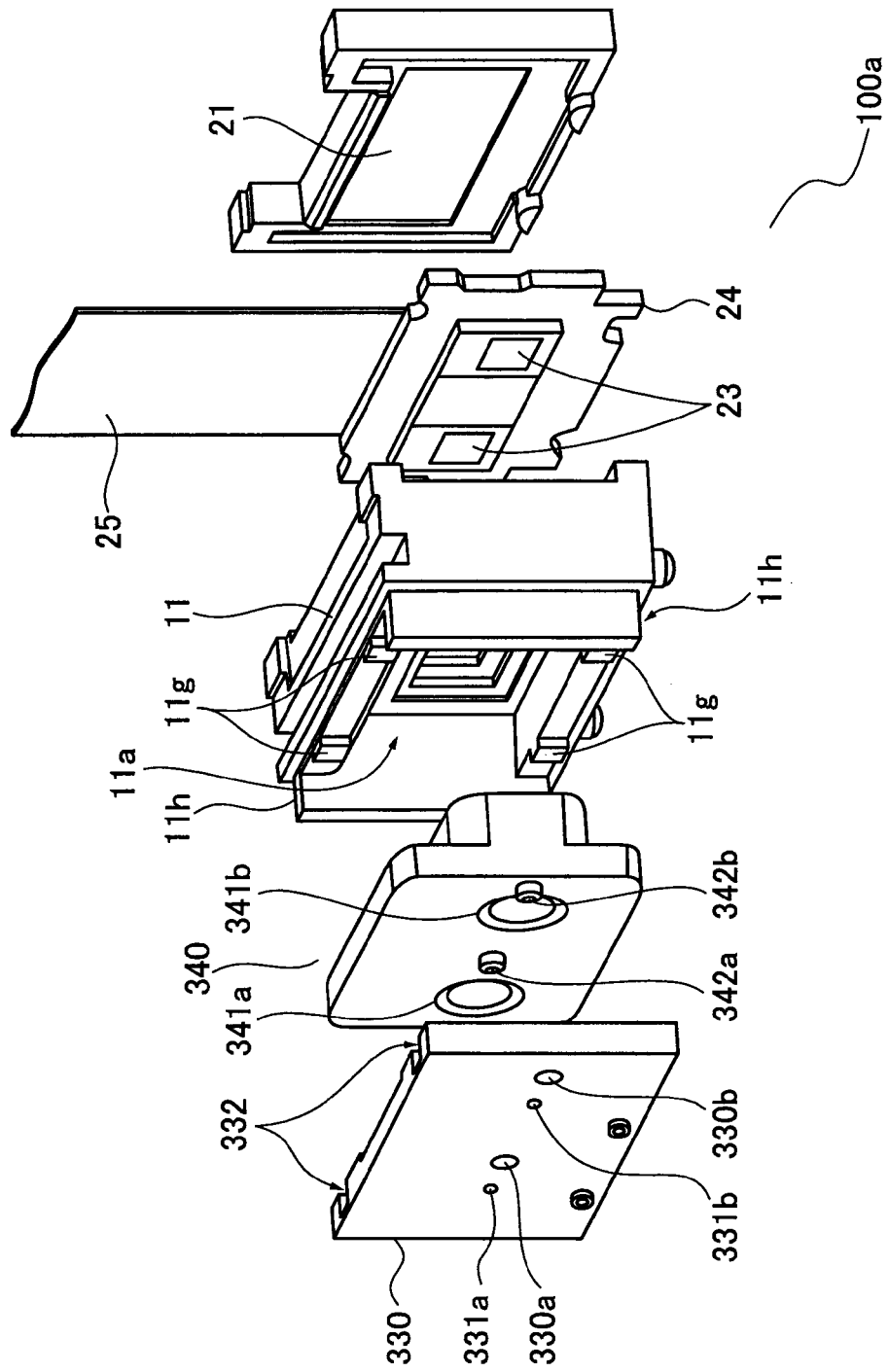
FIG. 9 is an exploded perspective view of the ranging apparatus according to the second embodiment of the present invention.

Next, an example of a create structure of the ranging apparatus 100a according to the second embodiment is explained with reference to FIG. 9.

Lens abutment parts 11g are provided on upper and lower end surfaces of a first recess 11a formed in the front surface of the body 11. When the lens unit 340 is fitted in the first recess 11a of the body 11, a back surface of the lens unit 340 abuts with the lens abutment parts 11g. The lens abutment parts 11g comprise protrusions each having a predetermined height so that an image picked up by the lens unit 340 is imaged on a light-receiving surface of the sensor unit 23 fixed on the back surface of the body 11, when the lens unit 340 is fitted in the first recess 11a of the body 11.

The lens unit 340 includes two ranging lenses 341a and 341b. The ranging lenses 341a and 341b are fixed to the lens unit 340 at a distance corresponding to a predetermined reference length necessary to ranging so as to be capable of measuring a distance to a subject by a principle of triangulation. Two bosses 342a and 342b which act as references for positioning of the lens unit 340 to the body 11 are provided on the front surface of the lens unit 340. The bosses 342a and 342b project together from the front surface of the lens unit 340. The boss 342a acts as a main reference for positioning the lens unit 340 and is used to fix a position of the lenses 341a and 341b accurately, when the lens unit 340 is attached to the body 11 and held by the lens holder 330. Here, the boss 342a is referred to as "main reference". On the other hand, the boss 342b acts to fix the lens unit 340 at a position when the lens unit 340 is positioned at the position by the boss 342a which is the main reference. The boss 342b is referred to as sub-boss as mentioned below.

The boss 342a which is the main reference is provided between the two lenses 341a and 341b, the boss 342b which is the sub-reference is provided outside the lenses 341a and 341b (a position that is not sandwiched by the lenses 341a and 341b). The bosses 342a and 342b are disposed on a line combining center points of the lenses 341a and 341b.

The lens holder 330 includes holes 331a and 331b through which an image of a subject to be measured passes, and positioning holes 330a and 330b in which the bosses 342a and 342b are inserted. The lens unit 340 and the lens holder 330 are fixed by inserting the boss 342a which is the main reference into the positioning hole 330a and the boss 342b which is the sub-reference into the positioning hole 330b.

Walls 11h are provided on right and left ends of the front surface of the body 11 and slits 332 are provided in right and left ends of the back surface of the lens holder 330 to face the walls 11h. The walls 11h are inserted in the slits 332, respectively, thereby the lens unit 340 is fixed to the body 11.

As mentioned above, the ranging apparatus 100a makes it possible to easily obtain positioning accuracy necessary to ranging by fitting the bosses 342a and 342b of the lens unit 340 formed on the line combining the center points of the lenses 341a and 341b into the positioning holes 330a and 330b provided in the lens holder 330. Consequently, even if heat expansion and heat shrinkage due to temperature changes occur in the lenses, it is possible to prevent a positioning of the lens unit 340 and the lens holder 330 from being misaligned.

Figure 10:
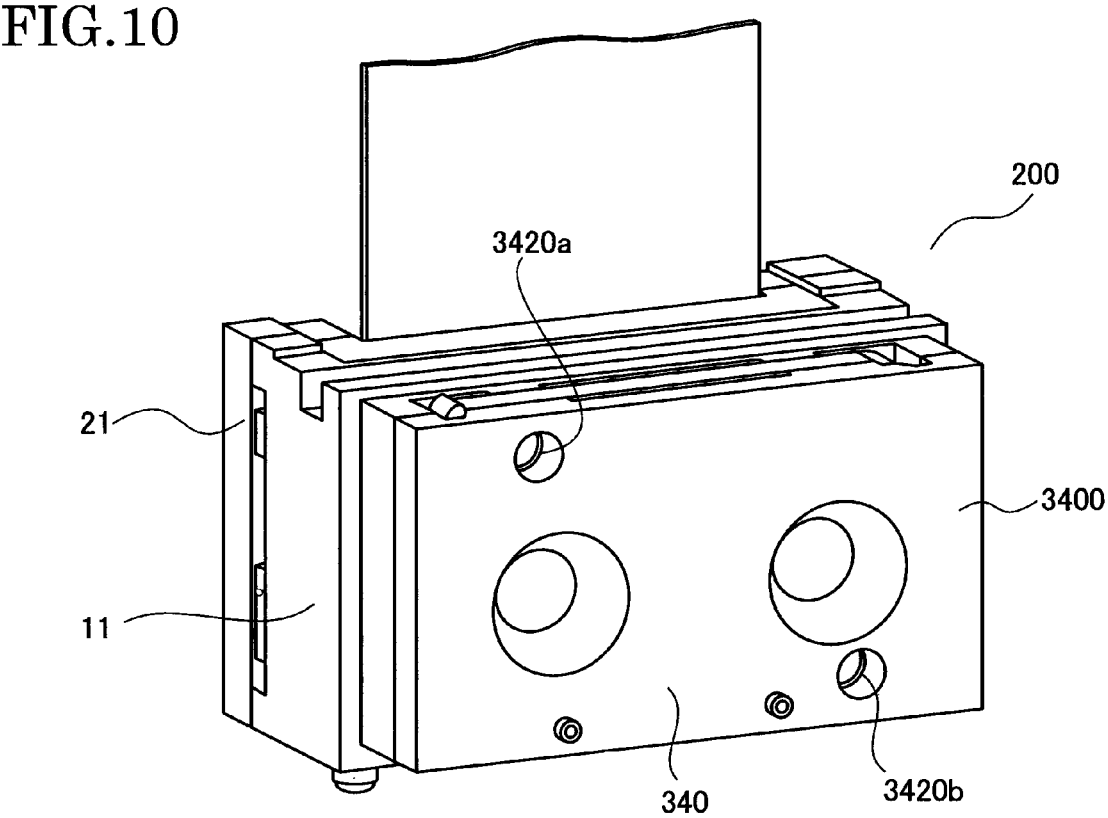
FIG. 10 is a perspective view showing another example of a mounting method of a lens unit and a body in the ranging apparatus according to the second embodiment.

The positions at which the bosses used for positioning the lens unit to the body are formed are not limited to the positions as mentioned above. For example, as shown in FIG. 10, a boss 3420a which is the main reference and a boss 3420b which is the sub-reference may be disposed on a diagonal line of the two lenses 341a and 341b.

In the ranging apparatus according the second embodiment as described above, it is possible to limit misalignment of the sensor unit and the lenses at minimum, acquire a high positioning accuracy with respect to the lenses and an imaging element relating to accuracy necessary to ranging, and accomplish easy assembly. In addition, it is possible to obtain a high stable ranging accuracy by configuring to be capable of assembling easily the bosses fixing the lens holder and the lens unit and forming the bosses at positions capable of restraining low variation in ranging accuracy even by temperature changes.

Figure 11:
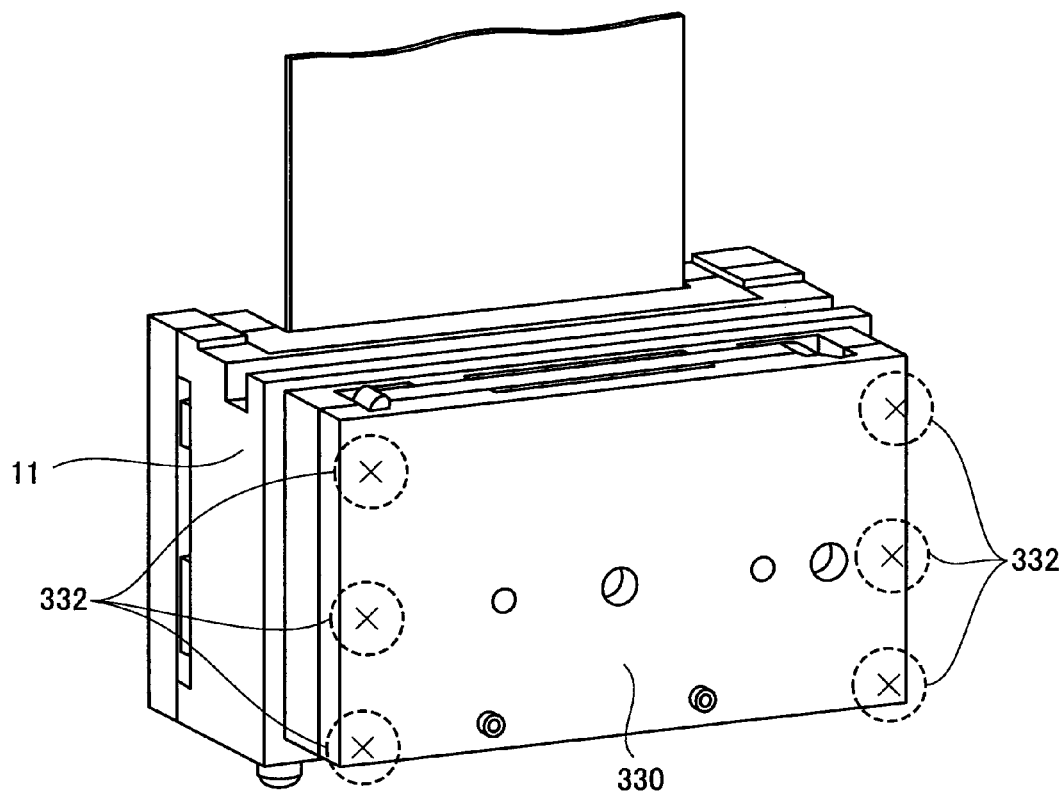
FIG. 11 is a perspective view showing an example of a method of fixing the body, the lens unit and a lens holder in the ranging apparatus according to the second embodiment.

Next, a method of fixing the lens unit 340 and the lens holder 330 to the body 11 integrally is explained with reference to FIG. 11.

The body 11 and the lens holder 330 are made of the same resin material through which a laser light can be transmitted. The body 11 and the lens holder 330 are fixed by irradiating the laser light at a plurality of portions 332 as shown in FIG. 11, to melt a boundary portion between the body 11 and the lens holder 330.

As mentioned above, it is possible to assemble easily and accurately the lens holder 330 and the lens unit 340 by inserting the bosses into the positioning holes after mounting the substrate 24 on which the sensor unit 23 is attached on the body 11 and the lens unit 340 on the body 11, and irradiating the laser light at the predetermined portions to melt the boundary portion of the body, lens unit and the lens holder.

Because the lens unit, the body and the sensor holder are welded by the laser light without using any adhesive, it is possible to prevent these parts from being misaligned by shrinkage of the adhesive when the adhesive is solidified.

According to the present invention, it is possible to accomplish accurately and easily a positioning of the sensor unit and the body with a pinpoint without requiring a complicate operation. In addition, it is possible to perform accurately and easily a positioning of the sensor unit and the lens. Moreover, according to the present invention, it is possible to fix the body to which the lens is fixed and the sensor unit by a laser welding in a short time. Furthermore, the present invention makes it possible to prevent variation in the positioning occurred by shrinkage or the like of the adhesive or the like after the positioning and to accomplish the reduction of assembly time.

As mentioned above, although the preferred embodiments of the present invention have been described, it should be understood that the present invention is not limited to these embodiments, various changes and modifications can be made to the embodiments. For example, the first protrusion 11c and the second protrusion 11f may be provided on the substrate 24, and the first groove 24a and the second groove 24b may be provided in the body 11. The third protrusion 21c and the fourth protrusion 21e may be provided on the substrate 24, and the third groove 24c and the fourth groove 24d may be provided in the sensor holder 21.

INDUSTRIAL APPLICABILITY

The ranging apparatus according to present invention can be applied to an imaging apparatus used for a digital camera and so on.

CROSS REFERENCE TO RELATED APPLICATION

This application is based on and claims the priority benefit of each of Japanese Patent Application Nos. 2010-291734, filed on Dec. 28, 2010 and 2011-074855, filed on Mar. 30, 2011 the disclosure of which is incorporated herein by reference in its entirety.

The invention claimed is:

1. A ranging apparatus, comprising:
a body;
a substrate on which a plurality of sensors is mounted and fitted to a surface of the body;
a sensor holder attached to the surface of the body and configured to hold the substrate on which the plurality of sensors is mounted;
a lens unit attached to another surface of the body; and
a positioning mechanism configured to position and connect the body, the substrate and the sensor holder,
wherein the positioning mechanism including a first engaging part and a second engaging part which are provided between the body and the substrate and configured to engage the body and the substrate, and a third engaging part and a fourth engaging part which are provided between the substrate and the sensor holder and configured to engage the substrate and the sensor holder,
wherein the first engaging part and the second engaging part being different in shape, and the third engaging part and the fourth engaging part being different in shape, and
wherein the first engaging part includes a first groove provided in the substrate and a first protrusion provided on the body and the first protrusion is engaged with the first groove, the second engaging part includes a second groove provided in the substrate and a second protrusion provided on the body and the second protrusion is engaged with the second groove, the third engaging part includes a third groove provided in the substrate and a third protrusion provided on the sensor holder and the third protrusion is engaged with the third groove, the fourth engaging part includes a fourth groove provided in the substrate and a fourth protrusion provided on the sensor holder and the fourth protrusion is engaged with the fourth groove.

2. The ranging apparatus according to claim 1, further comprising a recess provided in the surface of the body and an abutment part provided in the recess,
wherein the substrate is fitted in the recess, and
when the substrate is fitted in the recess, the abutment mechanism abuts with the plurality of sensors.

3. The ranging apparatus according to claim 1, wherein the first groove has a V-character shape and the second groove has a trapezoidal shape, the first protrusion is fitted in the first groove to be in contact with inclines of the first groove, and the second protrusion is fitted in the second groove to be in contact with an upper surface of the second groove.

4. The ranging apparatus according to claim 1, wherein the third groove has a V-character shape and the fourth groove has a trapezoidal shape, the third protrusion is fitted in the third groove to be in contact with inclines of the third groove, and the fourth protrusion is fitted in the fourth groove to be in contact with an upper surface of the fourth groove.

5. The ranging apparatus according to claim 1, further comprising an elastic member disposed between the substrate and the sensor holder.

6. The ranging apparatus according to claim 1, wherein the body and the sensor holder are fixed by a laser welding.

7. The ranging apparatus according to claim 1,
wherein the lens unit is attached to the body and a lens holder is attached to the body to hold the lens unit,
wherein the lens unit has at least two ranging lenses arranged at a predetermined interval,
two bosses are provided on a line passing centers of the lenses on one end surface of the lens unit,
two positioning holes are provided in the lens holder at positions facing the bosses, and
the lens unit and the lens holder are positioned by fitting the bosses in the positioning holes.

8. The ranging apparatus according to claim 1,
wherein the lens unit is attached to the body and a lens holder is attached to the body to hold the lens unit,
wherein the body and the lens holder are fixed by a laser welding.

* * * * *